E. H. NASH.
Milk Closet.
No. 21,016.
Patented July 27, 1858.
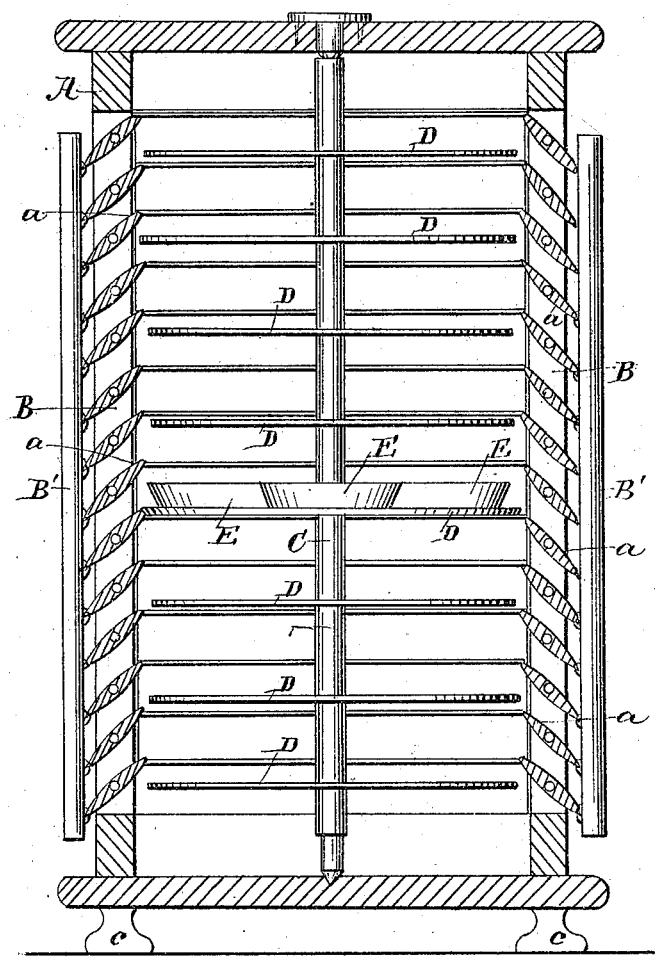

UNITED STATES PATENT OFFICE.

E. H. NASH, OF WESTPORT, CONNECTICUT.

CLOSET FOR MILK.

Specification of Letters Patent No. 21,016, dated July 27, 1858.

*To all whom it may concern:*

Be it known that I, EDWARD H. NASH, of Westport, in the county of Fairfield and State of Connecticut, have invented a new and useful Article or Device Designed for a Milk-Receptacle and which I term a "Portable Milk Closet or House;" and I do hereby declare that the following is a full, clear, and exact description of the same, reference being had to the annexed drawing, making a part of this specification, said drawing being a vertical central section of my invention.

The object of this invention is to obtain a cheap and portable device, one in which a large number of milk pans can be placed in as small a space as possible and in a very expeditious manner, the device being so arranged as to allow the air to circulate freely through it and at the same time obstruct the sun.

The invention is designed for those who have but a very small dairy, two small to warrant the building of an expensive milk house, and also for those who at certain times have a supply of milk greater than can be kept in the permanent milk houses.

To enable those skilled in the art to fully understand and construct my invention I will proceed to describe it.

A, represents a box or case, which may be of quadrilateral or other proper form, the quadrilateral form however would be the least expensive to construct and probably the most preferable. The principal portion of the sides of the box or case is formed of blinds B, constructed similarly to ordinary adjustable window blinds, viz., pivoted slats *a*, being attached to a rod B'. One side of the box or case is provided with a door which forms the whole of the side and is constructed precisely similar to the other sides. The box or case may be constructed wholly of wood and if desired provided with feet *c*.

Within the box or case A, a vertical shaft C, is placed. This shaft is allowed to rotate freely and a series of circular plates or shelves D, is permanently attached to the shaft, the shaft passing through the center of the shelves. The shelves D, are made as large in diameter as the box or case A, will allow and it is designed not to have the height of the topmost shelf so great as to prevent the milk pans being placed on it without the aid of steps.

The shaft C, may be of metal and metal plate may be used for the shelves. I do not however confine myself to any material.

The shelves D, are placed at equal and suitable distances apart sufficient space being allowed for the ready placing of the milk pans E, on the shelves and their removal therefrom.

From the above description of parts it will be seen that a large number of milk pans *d*, may be placed in a comparatively limited space and as the shaft C, and shelves D, are allowed to rotate freely the shelves may be readily filled with pans and the pans also readily removed therefrom. The blinds B, may be adjusted more or less open as desired, and the device may be readily removed from place to place as convenience may require.

I do not claim simply constructing a box or closet with blinds for sides so as to admit air and exclude the sun, for this is a common device and is used in many instances as in well-houses, etc. But

I claim as new and desire to secure by Letters Patent—

The box or case A, in combination with the rotating shaft C, and shelves D, arranged as and for the purpose specified.

EDWARD H. NASH.

Witnesses:
JOSEPH C. STURGESS,
G. L. CABLE.